United States Patent [19]

Bryan, Jr

[11] 4,014,460
[45] Mar. 29, 1977

[54] SPIKE ORIENTING AND POSITIONING SYSTEM

[76] Inventor: John F. Bryan, Jr., 3212 Mapleleaf Circle, Dallas, Tex. 75233

[22] Filed: Jan. 2, 1975

[21] Appl. No.: 538,115

[52] U.S. Cl. .............................. 221/156; 198/396; 198/400; 198/455

[51] Int. Cl.² ..................................... B65G 47/24

[58] Field of Search ............ 221/75, 156, 171, 172, 221/163, 164, 165, 200, 201, 224, 259, 277, 311, 312 R, 167, 168, 166; 198/212, 278, 279, 280

[56] References Cited

UNITED STATES PATENTS

| | | | |
|---|---|---|---|
| 1,503,494 | 8/1924 | Elliott | 221/168 |
| 1,615,137 | 1/1927 | Ruby | 221/172 X |
| 1,815,029 | 7/1931 | Albertoli | 198/280 X |
| 2,383,270 | 8/1945 | Niederer et al. | 221/165 X |
| 2,701,634 | 2/1955 | Carroll | 198/212 X |
| 3,057,514 | 10/1962 | Dixon | 221/168 X |
| 3,203,590 | 8/1965 | Maki | 221/224 X |
| 3,207,362 | 9/1965 | Gilbride et al. | 221/171 X |

Primary Examiner—Robert B. Reeves
Assistant Examiner—Joseph J. Rolla
Attorney, Agent, or Firm—Richards, Harris & Medlock

[57] ABSTRACT

In a spike orienting and positioning system, kegs of spikes are discharged onto a spike receiving surface. The spikes on the spike receiving surface are engaged by fingers which are first extended from and then retracted into a rotating drum whereby individual spikes are lifted from the spike receiving surface and then dropped. This causes the spikes to enter slots formed in the spike receiving surface in a shank down orientation. The spikes are normally prevented from passing through the slots by tires which engage the lowermost spikes in the slots and which are selectively rotated to discharge individual spikes. The discharged spikes are guided into helical funnels which function to rotate the spikes into predetermined orientations. The oriented spikes then enter chutes wherein they are temporarily retained by escapement mechanisms. Upon release by the escapement mechanisms, the spikes travel through the chutes into position for insertion.

56 Claims, 9 Drawing Figures

SPIKE ORIENTING AND POSITIONING SYSTEM

BACKGROUND AND SUMMARY OF THE INVENTION

This invention relates to a spike orienting and positioning system, and more particularly to a system for receiving spikes directly from kegs thereof and for automatically orienting and positioning the spikes for insertion.

Railroads and similar trackways are traditionally constructed by securing metal rails to wooden ties. This is accomplished by positioning the rails on metal tie plates which are in turn supported on the ties, and then driving spikes through spike receiving holes formed in the tie plates and into the underlying ties. The spikes which are employed for this purpose traditionally comprise a square shank extending from a chisel-like point at one end to an enlarged head at the other end. The heads of the spikes are not symmetrical, but instead project laterally from one side of the shank. It is therefore necessary to properly orient each spike prior to its insertion.

U.S. Pat. No. 3,753,404, granted to John F. Bryan, Jr. on Aug. 21, 1973, relates to a Spike Driving System whereby spikes are automatically driven through spike receiving holes formed in metal tie plates and into underlying wooden ties. U.S. Pat. No. 3,753,405, also granted to John F. Bryan, Jr. on Aug. 21, 1973, relates to a Spike Positioning System which functions to automatically align the spikes with the spike receiving holes prior to actuation of the spike driving system to effect insertion of the spikes. The present invention comprise a spike orienting and positioning system which is particularly useful in conjunction with the Spike Driving System disclosed in U.S. Pat. No. 3,753,404.

It should be noted that there are various requirements which must be fulfilled in order to provide a workable spike orienting and positioning system. First, it is necessary for the system to function in outdoor field conditions, and under the control of substantially unskilled operators and maintenance personnel. For these and other reasons the system must comprise uncomplicated parts, must be rugged and reliable in operation, and must function dependably under conditions of infrequent and unreliable servicing. Moreover, the system must be adapted for successful operation without necessitating minute adjustments of the component parts thereof.

The present invention comprises a novel spike orienting and positioning system which fulfills the foregoing and other requirements long since found wanting in the prior art. In accordance with the broader aspects of the invention, spikes are initially received directly from kegs thereof, and are then manipulated into a shank down orientation. The spikes are individually discharged, and following discharge each spike is rotated into a predetermined orientation. The oriented spikes are then positioned for insertion through a spike receiving hole in a tie plate and into the underlying wooden tie.

In accordance with more specific aspects of the invention, kegs of spikes are mounted on an assembly which dumps the spikes from the kegs onto an inclined spike receiving surface. A drum is mounted for rotation adjacent to the spike receiving surface and has a plurality of fingers mounted for rotation therewith. An eccentric mechanism mounted within the drum functions to extend the fingers into engagement with the spikes on the spike receiving surface whereby the spikes are lifted upwardly from the surface, and then to retract the fingers into the drum whereby the spikes are dropped.

As the spikes are lifted and dropped they fall into downwardly inclined slots formed in the spike receiving surface in a shank down orientation. Tires are positioned adjacent the lower ends of the slots and are normally held stationary, whereby the spikes are prevented from passing through the slots. The tires are selectively rotated to discharge individual spikes from the slots.

Each discharged spike is received by a guide which directs the spike into a helical funnel. The spike is guided in such a way that it does not engage the leading edge of the helical funnel. The helical funnel comprises a central passageway which receives the shank of the spike and a helically inclined surface which engages the head of the spike and thereby mechanically spins the spike into the desired orientation.

Oriented spikes are received from the helical funnel by a guide chute. The guide chute includes an escapement mechanism which temporarily retains the oriented spikes. The escapement mechanism then releases the spikes for travel through the guide chute into position for insertion through a spike receiving hole in a tie plate and into the underlying tie.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
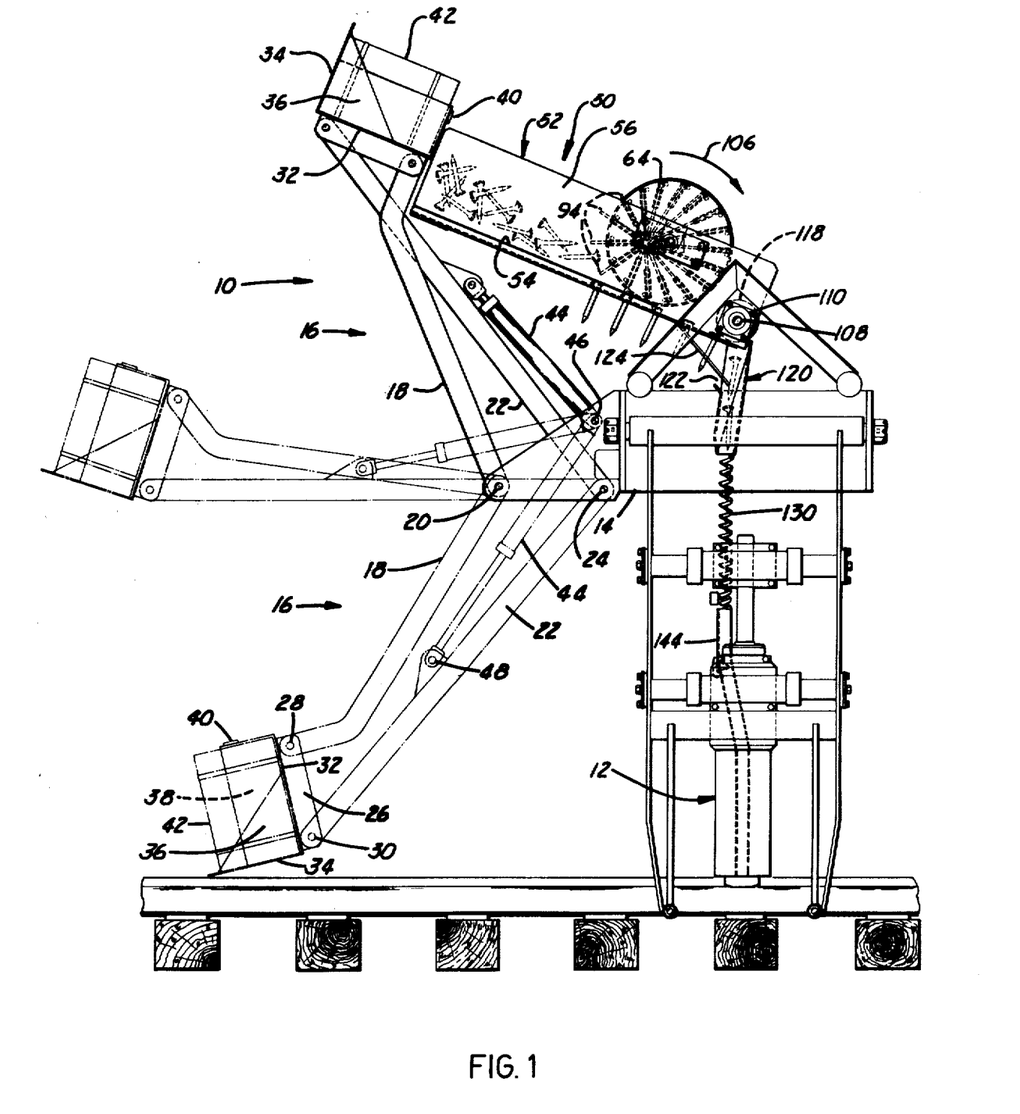
FIG. 1 is a side view of a spike orienting and positioning system incorporating the invention.

Referring now to the Drawings, and particularly to FIG. 1 thereof, there is shown a spike orienting and positioning system 10 incorporating the present invention. The spike orienting and positioning system 10 is utilized with a spike driving system of the type incorporating a plurality of spike driving cylinders 12. For example, the spike orienting and positioning system 10 may be utilized in conjunction with the spike driving system disclosed and claimed in U.S. Pat. No. 3,753,404, granted to John F. Bryan, Jr. on Aug. 21, 1973, for Spike Driving System.

The spike driving and positioning system 10 includes a frame 14 which is secured to the frame of the associated spike driving system. A keg lifting and dumping assembly 16 is mounted on the frame 14. The assembly 16 includes a first arm 18 which is generally J-shaped and which is pivotally connected to the frame 14 at 20 and a second arm 22 which is pivotally connected to the frame at 24. The arms 18 and 22 are pivotally connected to a bracket 26 at 28 and 30, respectively.

A side plate 32 is secured to the bracket 26, and a bottom plate 34 is secured to the side plate 32 by means of a pair of gussets 36 positioned at the opposite ends of the plates 32 and 34. A center plate 38 extends inwardly from the plate 32, and a top plate 40 is transversely disposed on the upper end of the center plate 38.

Figures 7, 8:
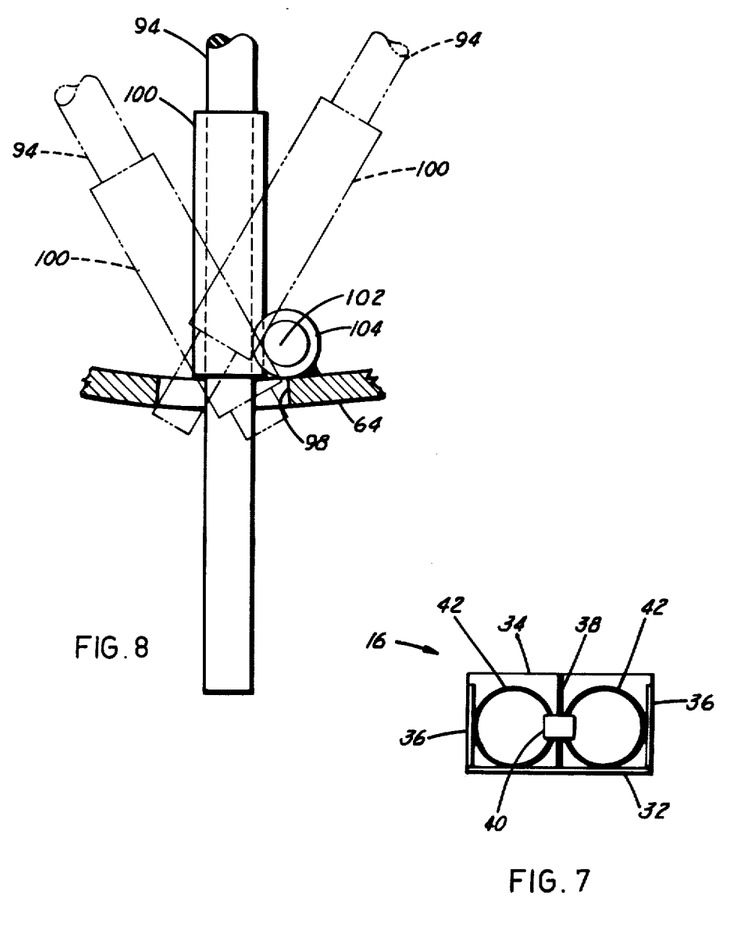
FIG. 7 is an illustration of a portion of the keg lifting and dumping assembly of FIG. 1.
FIG. 8 is an enlarged sectional view further illustrating the eccentric drum apparatus of FIG. 2.

Referring to FIG. 7, a pair of kegs 42 each filled with spikes (not shown in FIG. 7) are received by the keg lifting and dumping assembly 16. The kegs 42 are received on the bottom plate 34 and are engaged with the side plate 32. The kegs 42 are thus positioned between the gussets 36 and the center plate 38, and are retained by the top plate 40.

Referring again to FIG. 1, a hydraulic cylinder 44 is pivotally connected to the frame 14 at 46 and is pivotally connected to the arm 22 at 48. A hydraulic cylinder 44 is operable to manipulate the keg lifting and dumping assembly 16 from the lowermost keg receiving position as shown in FIG. 1 in phantom lines through the intermediate position to the uppermost keg dumping position which is illustrated in FIG. 1 in full lines. By this means the kegs 42 which are received in the assembly 16 when it is in the lowermost orientation as illustrated in FIG. 1 are lifted and the contents thereof, i.e., spikes, are dumped under the action of gravity.

It will thus be understood that the apparatus shown in FIG. 1 for lifting and dumping the spike kegs 42 comprises a novel four bar linkage which functions to first raise an article, and then to quickly invert the article. As such, the frame 14 comprises the first link of the four bar linkage, the first link comprising a fixedly supported, generally horizontally disposed link. The bracket 26 comprises the second link of the linkage and the arm 22 comprises the third link. The third link is characterized by a predetermined length which is longer than the length of the fourth link comprising the arm 18. The third and fourth links are pivotally connected to the first and second links at points positioned approximately the same distance apart.

The third and fourth links initially extend angularly downwardly from the first link to the second link, and the second link is initially oriented generally vertically. The cylinder 44 functions to pivot the second, third and fourth links concurrently upwardly from the lower position shown in dashed lines in FIG. 1 through the intermediate position to the upper position shown in full lines. During such concurrent upward pivotal movement of the second, third and fourth links relative to the first link, an article supported on the second link is first raised and is then rapidly inverted.

Figure 2:
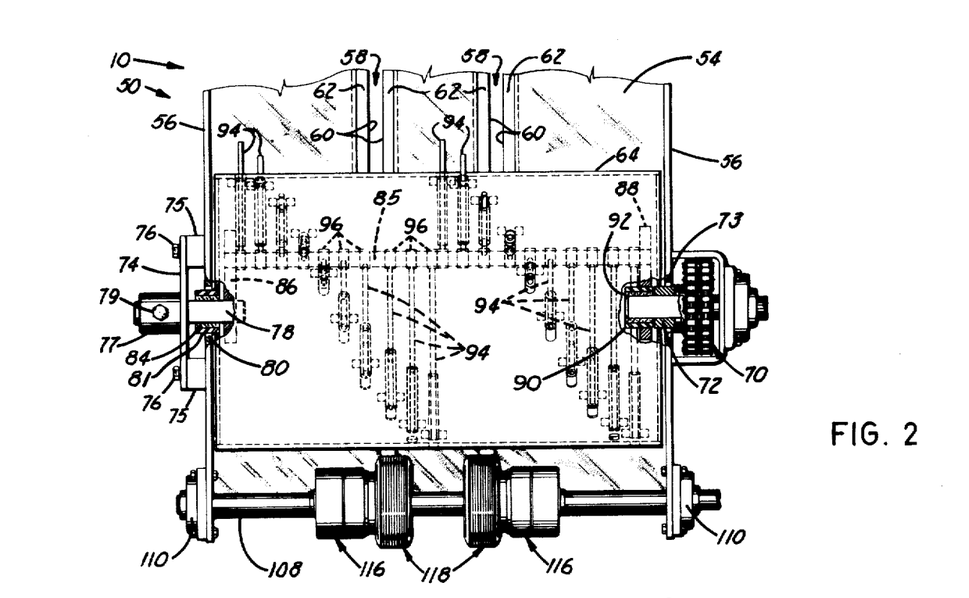
FIG. 2 is a top view of a portion of the system of FIG. 1.

Spikes are received from the kegs 42 in a spike aligning and discharging apparatus 50. The apparatus 50 includes a trough 52 having a downwardly inclined spike receiving surface 54 and opposed side walls 56. As is best shown in FIG. 2, the spike receiving surface 54 has a pair of aligned spike receiving slots 58 formed therein. The slots 58 are defined by opposed, parallel edges 60 positioned to receive spike shanks therethrough. A surface 62 extends adjacent each edge 60, with the surface 62 being positioned to engage the heads of spikes extending through the slots 58. The surfaces 62 are positioned substantially beneath the spike receiving surface 54 so that spikes are permitted to travel downwardly in the slots 58 under the action of vibration and gravity even though additional spikes may be supported above the slots 58 on the surface 54.

Figure 3:
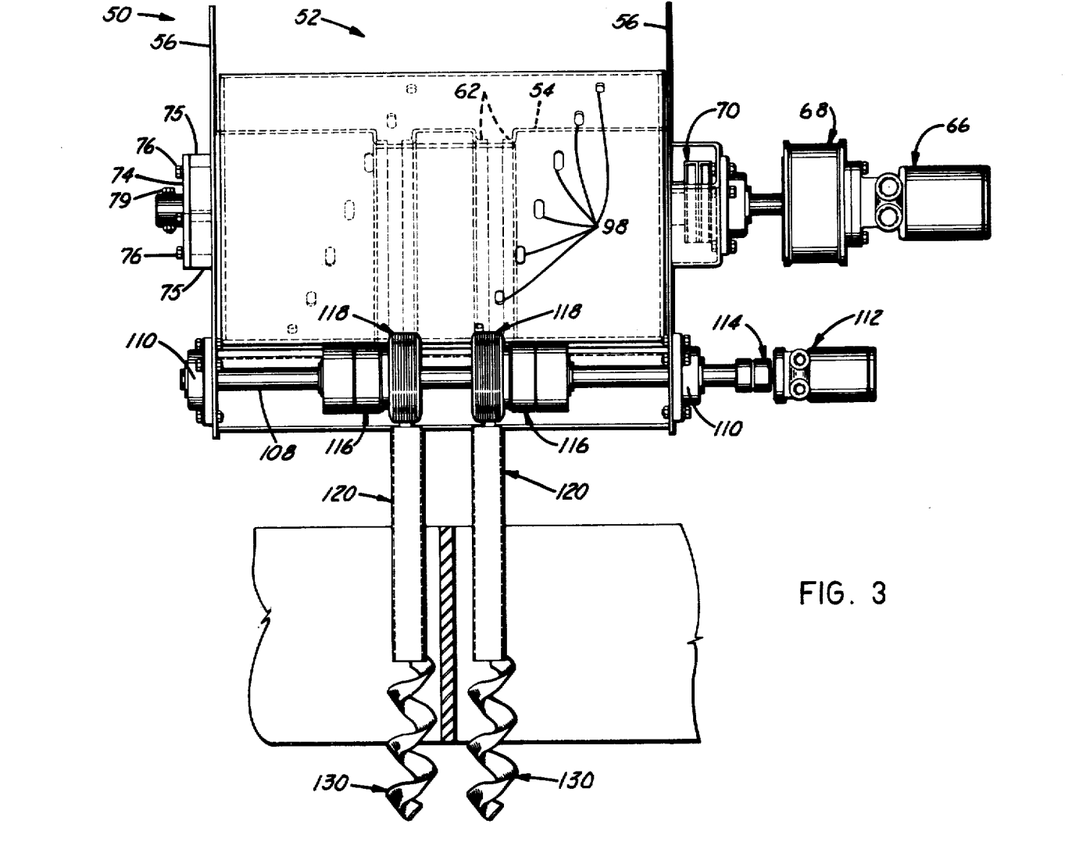
FIG. 3 is a partial front view.

The spikes that are received on the spike receiving surface 54 from the kegs 42 are randomly oriented. In order to assure that spikes from the surface 54 will enter the slots 58, a drum 64 is mounted for rotation immediately adjacent to the surface 54. Referring simultaneously to FIGS. 2 and 3, the drum 64 is continuously rotated by means of a motor 66 which may comprise a hydraulic motor, an electric motor, etc. The output of the motor is coupled to a speed reducer 68. The output of the speed reducer 68 is connected through a chain coupler 70. Referring specifically to FIG. 2, the output of the coupler 70 is connected through a collar 72 to the drum 64. The collar 72 extends through a hole 73 formed in the side wall 56 of the trough 52.

On the opposite side of the spike aligning and discharging apparatus 50 a bracket 74 is secured to the adjacent side wall 56 by means of spacers 75 and fasteners 76. A collar 77 is secured to the bracket 74 and a shaft 78 is secured to the collar 77 be mens of a fastener 79. The shaft 78 is thus fixedly mounted, and extends through a hole 80 formed in the side wall 56 of the trough 52. The drum 64 extends to a sleeve 82 which is rotatably supported by a busing 84 mounted on the shaft 78.

An eccentric shaft 85 is positioned within the drum 64. The shaft 85 is eccentrically positioned relative to the axis of rotation of the drum 64. Thus, one end of the shaft 85 is secured to the fixedly mounted shaft 78 by an arm 86. The opposite end of the shaft 85 is supported by a similar arm 88 which is supported by a sleeve 90 and a bushing 92.

A plurality of fingers 94 are each rotatably supported on the eccentric shaft 85 by a collar 96 which may be formed from a low friction material. Referring to FIG. 8, each finger 94 extends through a slot 98 formed through the drum 64. Adjacent to the slot 98 the finger 94 extends through a guide sleeve 100 which is secured to a pin 102. The pin 102 is pivotally supported in a pair of bushings 104 secured to the interior of the drum 64, thereby permitting the finger 94 to pivot through the various angular orientations illustrated in FIG 8.

Referring again to FIG. 1, the motor 66 rotates the drum 64 in the direction indicated by the arrow 106, which is opposite to the normal direction of spike movement down the surface 54. The fingers 94 are constrained for rotation with the drum 64 relative to the eccentric shaft 85. Due to the positioning of the eccentric shaft 85 relative to the axis of rotation of the drum 64, the fingers 94 are retracted into the guide sleeves 100 a they pass the lowest point in their rotation.

As each finger 94 is rotated upwardly with the drum 64 it is extended from the drum. The finger thus engages the randomly oriented spikes which have been received in the surface 54 from the kegs 42. Individual spikes from the surface 54 are thus raised or lifted by the extended fingers 94 rotating with the drum 64.

Prior to reaching the uppermost point of its rotation each finger 94 is retracted back onto its guide sleeve 100. Spikes lifted by the fingers 94 are therefore dropped prior to being carried over the top of the drum 64. It will thus be understood that in the operation of the spike aligning and discharging apparatus 50, spikes are continuously lifted from the spike receiving surface 54 and are subsequently dropped. Under this action spikes continuously enter the slots 58 in a shank down orientation.

Referring to FIG. 3, a shaft 108 is rotatably supported by means of a pair of bearings 110 which are secured to the side walls 56 of the trough 52. A drive motor 112, which may comprise a hydraulic motor, an electric motor, etc., is coupled to the shaft by means of a coupling 114. The shaft 108 is therefore continuously rotated under the action of the drive motor 112. A pair of clutch/brakes 116 ae supported on the shaft 108 and in turn support a pair of rubber tires 118. The clutch/brakes 116 normally maintain the rubber tires 118 in a stationary or fixed relationship relative to the slots 58 and spikes received therein. Upon actuation, the clutch/brakes 116 couple the tires 118 to the shaft 108 for rotation therewith.

Figures 4, 5:
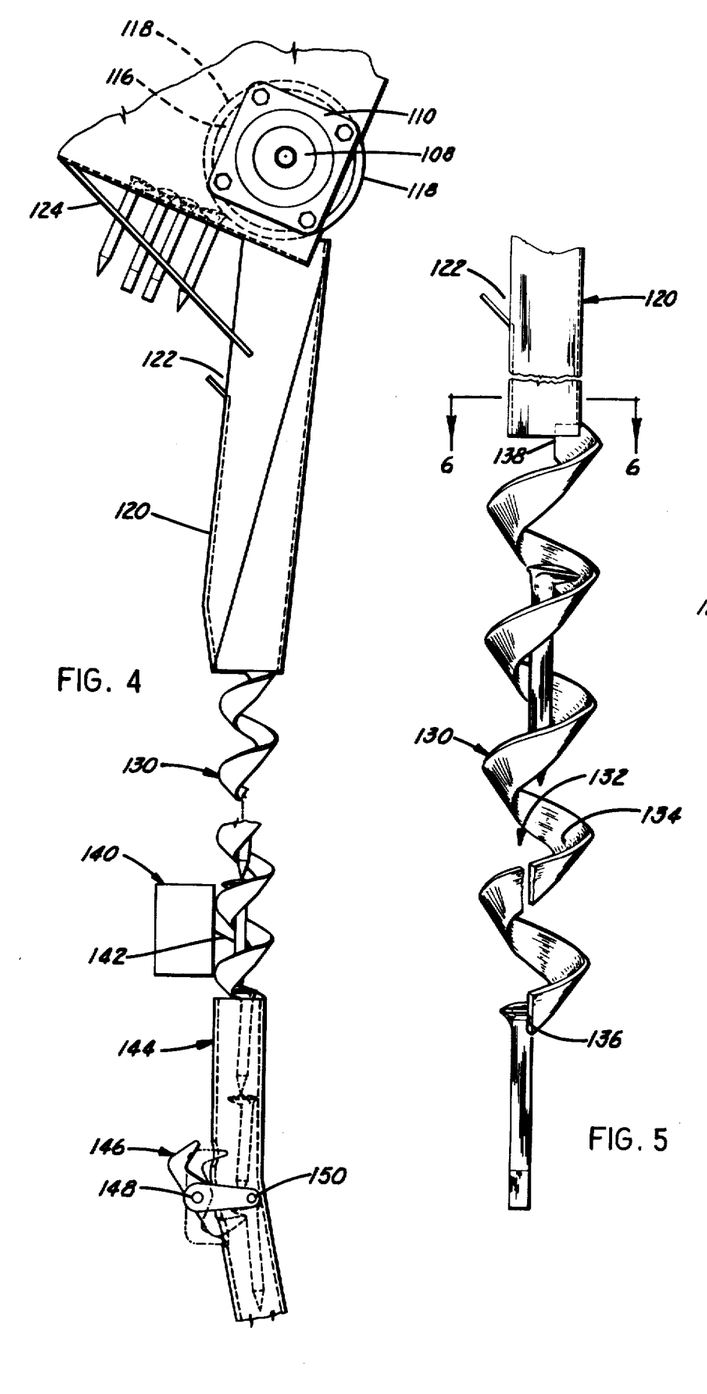
FIG. 4 is an enlargement of a portion of FIG. 1.
FIG. 5 is a further enlargement of a portion of FIG. 4.

Referring now to FIG. 4, spikes entering the slots 58 due to the action of the rotating drum 64 travel downwardly in the slots under the drum 64 due to the combined actions of gravity and vibration. Each rubber tire 118 engages the lowermost spike in the corresponding slot 58 and therefore normally prevent the spike from passing through the slot 58. Upon actuation of the corresponding clutch/brake 116, the rubber tire 118 is rotated, and therefore discharges the lowermost spike from the slot 58. The rotation of the rubber tire 118 may then be terminated so that the next spike in the slot 58 is prevented from passing therethrough, or may continue so that a plurality of spikes are discharged.

Figure 9:
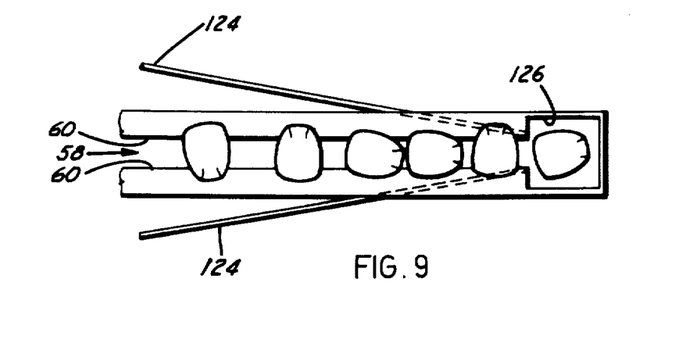
FIG. 9 is a further illustration of the spike receiving slot apparatus of FIG. 4.

When a spike is discharged from the slot 58 under the action of the rubber tire 118, it is received in a guide 120 and travels downwardly therein under the action of gravity. The guide 120 has a spike receiving opening 122. As is best shown in FIG. 9, a pair of brackets 124 guide the spikes in the slot 58 into the opening 122 of the guide 120. Each slot 58 extends to an opening 126 which is dimensioned to permit the spikes to pass through the opening 122 and into the guide 120 regardless of the orientation of the spikes.

Those skilled in the art will appreciate the fact that the spikes that are employed in the construction of railroads and similar trackways are not symmetrical. To the contrary, these spikes traditionally comprise a square shank extending from a chisel-like point at one end to an enlarged head at the other end. The hea of each spike projects laterally from the side of the shank. Therefore, even though the spikes are received in the guide 120 in a shank down orientation, it is necessary to properly orient the head of each spike before the spike can be inserted through a spike receiving hole formed in a tie plate and into the underlying wooden tie.

In the operation of the spike orienting and positioning system 10, the function of properly orienting the head of each spike prior to the insertion of the spike by the associated spike driving apparatus is performed by a helical funnel 130. As is best shown in FIG. 5, the helical funnel 130 has a central opening 132 which receives the shank of each spike and which guides the spike as it falls downwardly under the action of gravity. The helical funnel 130 further comprises a helically inclined surface 134 which engages the head of each spike passing through the helical funnel 130. The helically inclined surface 134 extends to a discharge end 136 positioned to discharge each spike with the head thereof in a predetermined alignment.

Figure 6:
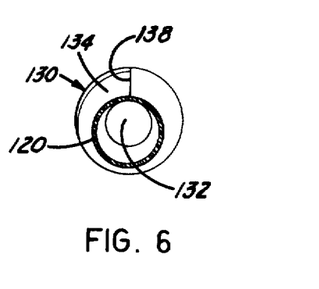
FIG. 6 is a sectional view taken generally along the lines 6—6 in FIG. 5 in the direction of the arrows.

The helical funnel 130 also has a leading edge 138. As is best shown in FIG. 6, the helical funnel 130 is mounted in an offset relationship with respect to the bottom end of the guide 120. By this means the guide 120 functions to prevent the spikes falling therethrough from engaging the leading edge 138 of the helical funnel 130. This is to prevent any possibility of a spike being retained due to engagement thereof with the leading edge 138.

As each spike falls from the guide 120 into the helical funnel 130, the head of the spike comes into engagement with the helically inclined surface 134. Due to mechanical action of the helically inclined surface 134 on the head of the spike, the spike is caused to rotate as it passes downwardly through the helical funnel 130. That is, due to the engagement of the spike head with the helically inclined surface, the spike must rotate in order to move downwardly in the helical funnel under the action of gravity. The rotation of the spike continues until the spike reaches the discharge end 136, at which the rotation of the spike terminates. As will be apparent by reference to FIG. 5, the engagement between the spike and the helically inclined surface 134 causes each spike to rotate through several complete rotations as it passes downwardly through the helical funnel 130. Therefore, each spike leaves the helical funnel 130 with its head aligned in a predetermined orientation regardless of the orientation of the spike when it enters the helical funnel 130 from the guide 120.

Referring again to FIG. 4, a spike detection apparatus 140 is positioned adjacent to the helical funnel 130. For example, the spike detection apparatus 140 may comprise a spring-biased arm 142 extending to appropriate switching apparatus. The spike detection apparatus 140 may also include various types of pneumatic, fluidic, photoelectric, ultrasonic, magnetic and/or other conventional devices for the purpose of detecting the presence of spikes in the helical funnel 130.

The function of the spike detection apparatus 140 is to control the operation of the associated clutch/brake 116, and hence the rotation of the rubber tire 118. Whenever the spike detection apparatus 140 does not detect a spike in the helical funnel 130, the associated clutch/brake 116 is actuated to rotate its rubber tire 118. This causes a spike to be discharged from the aligned slot 58 and to fall through the guide 120 and through the helical funnel 130.

The operational inter-relationship between each spike detection apparatus 140 and the associated clutch/brake 116 is such that one or two spikes are accumulated in the helical funnel 130 above the spike detection apparatus 140 following each actuation of the clutch/brake 116. When the last of these accumulated spikes have moved downwardly beyond the spike detection apparatus 140, the clutch/brake 116 is again actuated to rotate the tire 118, whereby one or more spikes are discharged from the aligned slot 58.

Upon leaving the helical funnel 130, each spike enters a chute 144. The function of the chute 144 is to guide the spikes into position for insertion by the associated spike driving system. The construction and operation of the chute 144 is fully disclosed in U.S. Pat. No. 3,753,404, granted to John F. Bryan, Jr., on Aug. 21, 1973, for Spike Positioning System.

The chute 144 includes an escapement 146. The escapement 146 comprises a bell crank which is pivotally supported at 148. A pin 150 is operatively connected to the ram of the spike driving cylinder of the associated spike driving apparatus. Thus, during each cyle of operation of the ram of the spike driving cylinder, the escapement 146 is actuated to release one spike. The released spike then passes through the chute 144 and is brought into alignment for insertion during the next operating cycle of the spike driving cylinder of the spike driving system.

OPERATION

In the operation of the spike orienting and positioning system 10, kegs of spikes 42 are received by the keg lifting and dumping assembly 16. This is accomplished by manually positioning the kegs of spikes 42 on the bottom plate 34 in alignment with the side plate 32 and under the plate 40. The cylinder 44 is then actuated to raise the kegs 42 and to dump the kegs into the spike orienting and discharging apparatus 50.

Upon discharge from the kegs 42, the spikes are received on the spike receiving surface 54 in a ramdon orientation. The drum 64 is rotated, whereby the fingers 94 are extended into engagement with the randomly oriented spikes on the surface 54. The fingers 94 function to lift and drop the spikes, whereby the spikes are received in the slots 58.

The spikes travel downwardly in the slots 58 under the action of gravity and vibration. The spikes thus pass under the drum 64. The rubber tires 118 normally prevent the spikes from passing through the slots 58. Upon actuation, the rubber tires 118 discharge individual spikes from the slots 58 into the guides 120.

The spikes pass through each guide 120 and into the helical funnel 130. In the helical funnel 130, each spike is rotated into a predetermined orientation. The spikes are then discharged into the chute 144. The operation of each rubber tire 118 to discharge spikes from the slot 58 into the guide 120 and through the helical funnel 130 is under the control of the associated spike detection apparatus 140.

The oriented spikes passing from the helical funnel 130 and into the chute 144 are temporarily retained by the escapement 146. At a predetermined time in the operating cycle of the associated spike driving system, the escapement 146 is actuated to release an individual spike. The spike then passes through the chute 144 and into position for insertion by the associated spike driving system.

The spike driving system is preferably of the type disclosed and claimed in U.S. Pat. No. 3,753,404. In the operation of such a spike driving system, each spike driving cylinder and the associated chute which positions spikes for insertion is aligned with a spike receiving hole in a tie plate. The alignment function is carried out by a spike positioning system, which preferably is of the type disclosed and claimed in U.S. Pat. No. 3,753,405. In the operation of such a spike driving system under the control of such a spike positioning system, the spike driving cylinder and the associated spike positioning chute are first moved transversely relative to the rails comprising a railroad or similar trackway, and are then moved longitudinally in order to align the spike driving cylinder and the chute with a spike receiving hole.

The spike orienting and positioning system of the present invention is advantageously employed in conjunction with such a spike driving system and such a spike positioning system. Thus, in addition to performing the function of properly orienting each spike, the helical funnel 130 of the present invention is sufficiently flexible to accommodate the movements of the chute 144 which are necessary in the operation of the spike driving system and the spike positioning system. It is therefore possible for the keg lifting and dumping assembly 16 and for the spike orienting and discharging apparatus 50 to be fixedly mounted relative to the frame 14 and the associated spike driving system.

From the foregoing, it will be understood that the present invention comprises a spike orienting and positioning system incorporating numerous advantages over the prior art. First, systems incorporating the invention are rugged and reliable and are comprised of uncomplicated component parts. This is advantageous in that such systems are relatively economical to construct and use, and are adapted for long term service in outdoor field conditions under the control of substantially unskilled operators and maintenance personnel. It will be further appreciated that absolutely no minute adjustments are necessary to the successful operation of the system, thereby further contributing to the economy and the reliability of its operation.

Although preferred embodiments of the invention have been illustrated in the accompanying Drawings and described in the foregoing Detailed Description, it will be appreciated that the invention is not limited to the embodiments disclosed, but is capable of numerous rearrangements, modifications and substitutions of parts and elements without departing from the spirit of the invention.

What is claimed is:

1. A spike orienting and positioning system comprising:
    means forming an inclined surface for receiving a plurality of randomly oriented spikes each having a head and a shank and having at least one spike receiving slot formed therein defined by spaced, parallel surfaces positioned to receive spike shanks therethrough and to support received spikes by engagement with the spike heads;
    means for agitating spikes comprising the plurality of randomly oriented spikes received on the surface so that spikes from the plurality fall into the slot formed in the surface;
    means for normally retaining spikes in the slot formed in the surface and for selectively discharging individual spikes from the slot;
    a helix for receiving individual spikes from the slot with the heads of the spikes randomly oriented relative to the spike axes and for rotating each received spike through at least one complete rotation about its axis and thereby positioning the head of the spike in a predetermined orientation relative to the spike axis regardless of the original orientation of the spike; and
    means for receiving each spike from the helix and for positioning the spike to be driven.

2. The spike orienting and positioning system according to claim 1 further including means for receiving at least one keg of spikes and for discharging the contents of the keg of spikes onto the inclined spike receiving surface.

3. The spike orienting and positioning system according to claim 1 wherein the means for agitating spikes comprising the plurality of randomly oriented spikes includes:
    rotating drum means positioned adjacent to the inclined spike receiving surface;

a plurality of fingers mounted for rotation with the drum means; and eccentric means for extending the fingers into engagement with the plurality of randomly oriented spikes to effect lifting of the spikes and for subsequently retracting the fingers to effect dropping of the spikes.

4. The spike orienting and positioning system according to claim 1 wherein the means for normally preventing spikes from passing out of the slot and for selectively discharging individual spikes from the slot comprises a tire positioned at the lower end of the slot in engagement with the lowermost spikes therein, means for normally preventing rotation of the tire and thereby preventing spikes from passing out of the slot, and means for selectively rotating the tire and thereby positively discharging the lowermost spike from the slot.

5. The spike orienting and positioning system according to claim 1 wherein the helix comprises helical funnel means for orienting the spikes.

6. The spike orienting and positioning system according to claim 5 wherein the helical funnel means is further characterized by a central opening for receiving and guiding the spike shanks and a helically inclined surface for engaging the spike heads and thereby spinning the spikes into a predetermined orientation.

7. A spike orienting and positioning system comprising:

means forming a spike receiving surface for receiving spikes each having a head and a shank extending angularly downwardly from an upper spike receiving portion to a lower spike discharging portion;

means forming at least one slot in the spike receiving surface defined by spaced, parallel surfaces positioned to receive spike shanks therethrough and to support received spikes by engagement with the spike heads;

means positioned adjacent to the spike receiving surface for lifting spikes from a plurality of randomly oriented spikes received thereon and for dropping the spikes so that spikes enter the spike receiving slot in a shank down orientation;

means positioned at the lower end of the slot in the spike receiving surface for normally preventing spikes from passing through the slot and for selectively discharging individual spikes from the slot;

helical funnel means for receiving individual spikes and for discharging each spike in a predetermined orientation;

guide means for receiving individual spikes from the discharge ends of the slot in the slot receiving surface and for directing each spike into the helical funnel means while preventing the spikes from engaging the leading end of the helical funnel means; and chute means for receiving spikes from the helical funnel means and for positioning the spikes for insertion.

8. The spike orienting and positioning system according to claim 7 wherein the slot in the spike receiving surface is defined by surfaces positioned below the spike receiving surface to permit spikes to move through the slot under randomly oriented spikes on the spike receiving surface and under the spike lifting and dropping means.

9. The spike orienting and positioning system according to claim 7 further including means for receiving a keg of spikes and for discharging the contents of the keg of spikes onto the spike receiving surface.

10. The spike orienting and positioning system according to claim 7 wherein the spike lifting and dropping means comprises:

rotating drum means positioned adjacent the spike receiving surface;

a plurality of fingers mounted for rotation with the rotating drum means; and eccentric means mounted within the rotating drum means and connected to the fingers for extending the fingers into engagement with spikes comprising the randomly oriented plurality thereof to effect lifting of the spikes and for subsequently retracting the fingers to effect dropping of the spikes.

11. The spike orienting and positioning system according to claim 7 wherein the means for normally preventing spikes from passing through the slot and for selectively discharging individual spikes comprises:

a tire mounted for rotation adjacent to the discharge portion of the spike receiving surface;

means for normally preventing rotation of the tire and thereby preventing spikes from passing through the slot; and means for selectively rotating the tire and thereby positively discharging individual spikes from the lower end of the slot into the guide means.

12. The spike orienting and positioning system according to claim 7 wherein the helical funnel means comprises:

a central opening for receiving and guiding spike shanks; and a helically inclined surface for frictionally engaging spike heads and thereby spinning the spikes into a predetermined orientation;

the helically inclined surface extending to a discharge end positioned to release the spikes with the heads in the predetermined orientation.

13. The spike orienting and positioning system according to claim 7 wherein the chute means further comprises escapement means for receiving spikes from the helical funnel means and for selectively retaining and subsequently discharging individual spikes.

14. In a spike orienting and positioning system, the improvement comprising:

means forming a spike receiving surface for receiving spikes each having a head and a shank which extends downwardly from an upper spike receiving portion to a lower spike discharging portion;

slot means formed in the spike receiving surface and comprising spaced, parallel surfaces positioned to receive spike shanks therebetween and to support the received spikes by means of engagement with the spike heads;

means for agitating spikes comprising the plurality of randomly oriented spikes received on the surface so that the spikes from the plurality fall into the slot means in a shank down orientation;

said spike agitating means comprising:

a drum positioned adjacent to and above the spike receiving surface;

means for continuously rotating the drum in a direction opposite to the direction of movement of spikes down the spike receiving surface under the action of gravity;

a plurality of fingers mounted within the drum for rotation therewith; and eccentric means mounted within the drum for extending the fingers to engage spikes on the spike receiving surface and for subsequently retracting the fingers to drop the spikes; and whereby the agitating means comprises means for lifting spikes upwardly from the spike receiving surface and for subsequently dropping the lifted spikes so that the spikes fall into the slot means in a shank down orientation.

15. The improvement according to claim 14 wherein the slot means in the spike receiving surface is defined by surfaces positioned below the spike receiving surface to permit spikes to move through the slot under randomly oriented spikes on the spike receiving surface.

16. The improvement according to claim 14 further including means for receiving a keg of spikes and for discharging spikes from the keg onto the spike receiving surface with the spikes oriented randomly.

17. The improvement according to claim 14 further characterized by means located adjacent to the discharge portion of the spike receiving surface for normally preventing spikes from passing through the slot means and for selectively discharging individual spikes from the slot means.

18. The improvement according to claim 14 wherein the means for normally preventing spikes from passing through the slots means and for selectively discharging individual spikes from the slot means comprises a wheel positioned adjacent to the slot means in the discharge portion of the spike receiving surface, means for normally preventing rotation of the wheel and thereby preventing the spikes from passing through the slot means, and means for selectively rotating the wheel and thereby discharging individual spikes from the slot means.

19. The improvement according to claim 14 further including a helix for receiving individual spikes from the slot means and for rotating the spikes into a predetermined orientation.

20. The improvement according to claim 19 wherein the helix comprises helical funnel means including a central opening for receiving and guiding the spike shanks and a helically inclined surface for engaging the spike heads and thereby spinning the spikes into a predetermined orientation.

21. In a spike orienting and positioning system, the improvement comprising:

means for discharging individual spikes each having a head and a shank with each spike having a shank down orientation; and a helix for receiving the discharged spikes with the heads of the spikes randomly oriented relative to the spike axes and for rotating each spike through at least one complete rotation about its axis and thereby positioning the head of the spike in a predetermined orientation relative to the spike axis as the spike moves downwardly through the helix under the action of gravity.

22. The improvement according to claim 21 wherein the helix is flexible so as to accommodate relative lateral movement of the lower end thereof with respect to the upper end.

23. The improvement according to claim 21 wherein the helix comprises helical funnel means including a central opening for receiving the spike shanks and a helically inclined surface for engaging the spike heads and thereby spinning each spike into the predetermined orientation.

24. The improvement according to claim 23 wherein the helical funnel means extends to chute means for receiving the oriented spikes and for positioning the spikes for insertion.

25. The improvement according to claim 21 wherein the means for discharging individual spikes comprises slot means for receiving spikes in a shank down orientation, and means for selectively discharging individual spikes from the slot means.

26. The improvement according to claim 25 wherein the slot means extends angularly downwardly and wherein the discharging means comprises a wheel means positioned adjacent the lower end of the slot means, means for normally preventing rotation of the wheel and thereby retaining spikes in the slot means, and means for selectively rotating the wheel and thereby discharging individual spikes from the slot means.

27. The improvement according to claim 25 further characterized by:

a spike receiving surface extending to the slot means; and means for continuously lifting spikes off of the spike receiving surface and for subsequently dropping the lifted spikes so that the spikes fall into the slot means.

28. The improvement according to claim 27 wherein the spike lifting and dropping means comprises:

drum means rotating adjacent to the spike receiving surface;

a plurality of fingers mounted within the drum means for rotation therewith; and eccentric means for extending the fingers from the drum means to receive and for thereafter retracting the fingers to drop the spikes.

29. A spike orienting and positioning process comprising:

receiving a plurality of spikes each having a head and a shank with the individual spikes oriented randomly;

receiving individual spikes from the plurality in at least one slot and thereby orienting the spikes in a shank down orientation;

discharging individual spikes from the slot;

directing each discharged spike through a helix and engaging the head of the discharged spike with the helix as the spike passes through the helix and thereby spinning the discharged spike into a predetermined orientation; and positioning the oriented spike for insertion.

30. The spike orienting and positoning process according to claim 29 wherein the step of receiving a plurality of randomly oriented spikes is carried out by receiving the plurality of randomly oriented spikes on a spike receiving surface; and wherein the step of receiving individual spikes from the plurality in a slot is carried out by agitating spikes from the plurality so that spikes from the plurality fall into the slot.

31. The spike orienting and positioning process according to claim 29 wherein the step of discharging individual spikes from the slot is carried out by:

normally engaging the lowermost spike in the slot with a normally stationary tire and thereby preventing the spike from passing through the slot; and selectively rotating the tire and thereby discharging the lowermost spike from the slot.

32. The spike orienting and positioning process according to claim 29 wherein the step of engaging the head of the discharged spike with a helix is further characterized by:
   directing the shank of the spike through a passageway extending through a helical funnel; and
   simultaneously engaging the head of the spike with a helically inclined surface defining the helical funnel and thereby spinning the spike into the predetermined orientation.

33. The spike orienting and positioning process according to claim 29 wherein the spike positioning step is further characterized by temporarily retaining the oriented spike and subsequently releasing the oriented spike for passage through a chute and into position for insertion.

34. A spike orienting and positioning process comprising:
   receiving a plurality of randomly oriented spikes each having a head end a shank on a spike receiving surface;
   agitating spikes from the plurality so that the spikes from the plurality are received in the slot and are thereby oriented in a shank down orientation;
   selectively discharging individual spikes from the slot;
   directing the discharged spikes through a helix;
   engaging the head of each spike with the helix as the spike passes through the helix and thereby spinning the spikes into a predetermined orientation; and
   subsequently positioning the oriented spike for insertion.

35. The spike orienting and positioning process according to claim 24 wherein the step of receiving a plurality of randomly oriented spikes on the spike receiving surface is carried out by dumping the contents of the keg of spikes onto the spike receiving surface.

36. The spike orienting and positioning process according to claim 34 wherein the step of discharging individual spikes from the slot is carried out by engaging the lowermost spike in the slot with a normally stationary tire and thereby preventing spikes from passing through the slot, and selectively rotating the tire to discharge individual spikes from the slot.

37. The spike orienting and positioning process according to claim 34 wherein the step of positioning the spikes for insertion is further characterized by the step of temporarily retaining oriented spikes, and subsequently releasing the oriented spikes for movement through a chute into position for insertion.

38. The spike orienting and positioning process according to claim 34 wherein the step of agitating spikes from the plurality is carried out by lifting the spikes and then dropping the spikes so that the spikes fall into the slot.

39. The spike orienting and positioning process according to claim 38 wherein the step of lifting and dropping the spikes is carried out by:
   extending fingers from a rotating drum into engagement with the plurality of randomly oriented spikes to lift the spikes; and
   subsequently retracting the fingers into the drum and thereby dropping the lifted spikes.

40. The spike orienting and positioning process according to claim 39 further characterized by guiding spikes discharged from the slot into the helix while simultaneously preventing the spikes from engaging the leading edge of the helix.

41. The spike orienting and positioning process according to claim 40 further characterized by engaging the head of each spike with a helically inclined surface and thereby rotating the spike into a predetermined orientation.

42. In a spike orienting and positioning process, the improvement comprising:
   receiving a plurality of randomly oriented spikes each having a head and a shank on an inclined spike receiving surface having at least one slot formed therein characterized by spaced, parallel edges positioned to receive spikes therethrough and to support the received spikes by engagement with the spike heads;
   lifting individual spikes from the plurality and subsequently dropping each lifted spike back toward the surface under the action of gravity so that spikes from the plurality fall into the slot formed in the spike receiving surface;
   selectively discharging individual spikes from the slot; and
   directing the discharged spikes through a helix and engaging the head of each spike with the helix as the spike passes through the helix and thereby rotating the spike into a predetermined orientation.

43. The improvement according to claim 42 further characterized by dropping each discharged spike through a helical funnel under the action of gravity, and engaging the head of each spike with a helically inclined surface defining the helical funnel as the spike passes through the helical funnel under the action of gravity and thereby rotating the spike into the predetermined orientation.

44. In a spike orienting and positioning process, the improvement comprising;
   directing individual spikes each having a head and a shank through a helix comprising a helical funnel having a central opening for receiving the spike shank; and
   engaging the head of each spike with a helically inclined surface defining the helical funnel as the spike passes therethrough and thereby rotating the spike into a predetermined orientation.

45. The improvement according to claim 44 further characterized by the step of dropping the spike through the helix under the action of gravity so that the head of the spike engages the helix as the spike passes through the helix.

46. The improvement according to claim 44 further characterized by guiding each spike into the helical funnel while simultaneously preventing the spike from engaging the leading edge of the helical funnel.

47. The improvement according to claim 46 further characterized by selectively positioning the lower end of the helical funnel relative to the upper end thereof and thereby positioning spikes passing through the funnel for insertion.

48. In a spike orienting and positioning system, the improvement comprising:
   a helix for receiving individual spikes each having a head and a shank with the heads thereof randomly oriented about the spike axes and for engaging the head of each spike and thereby rotating each spike into a predetermined orientation of the spike head relative to the spike axis;

said helix rotating each received spike through at least one complete rotation about its axis and thereby assuring the positioning of the spike head in the predetermined orientation regardless of its initial orientation.

49. The improvement according to claim 49 wherein the helix is vertically oriented, and further including means for discharging individual spikes into the helix so that each spike passes through the helix under the action of gravity.

50. In a spike positioning and orienting system, the improvement comprising:
   a helical funnel for receiving individual spikes each having a head and a shank and comprising a central opening for receiving spike shanks and a helically inclined surface defining the helical funnel for engaging spike heads and thereby rotating each spike into a predetermined orientation, said inclined surface rotating each spike through at least one complete rotation about its axis so that each spike is rotated into the predetermined orientation regardless of its initial orientation.

51. The improvement according to claim 50 wherein the helical funnel is vertically oriented and further including means for discharging individual spikes into the helical funnel so that each spike passes through the helical funnel under the action of gravity.

52. In a spike positioning and orienting system, the improvement comprising:
   a helical funnel for receiving individual spikes each having a head and a shank and comprising a central opening for receiving spike shanks and a helically inclined surface defining the helical funnel for engaging spike heads and thereby rotating each spike into a predetermined orientation, said helical funnel being vertically oriented, means for discharging individual spikes into the helical funnel so that each spike passes through the helical funnel under the action of gravity, said helical funnel being further characterized by a leading edge, and means for preventing spikes from engaging the leading edge of the helical funnel.

53. The improvement according to claim 52 wherein the helical funnel further comprises a discharge end, and wherein the helical funnel is flexible to accommodate lateral displacement of the discharge end relative to the leading edge.

54. A spike orienting and positioning system comprising:
   means forming an inclined surface for receiving a plurality of randomly oriented spikes each having a head and a shank and having at least one spike receiving slot formed therein defined by spaced, parallel surfaces positioned to receive spike shanks therethrough and to support received spikes by engagement with the spike heads;
   means for agitating spikes comprising the plurality of randomly oriented spikes received on the surface so that spikes from the plurality fall into the slot formed in the surface;
   means for normally retaining spikes in the slot formed in the surface and for selectively discharging individual spikes from the slot;
   a helix for receiving individual spikes from the slot and for rotating each received spike into a predetermined orientation regardless of the original orientation of the spike;
   guide means for receiving individual spikes from the slot in the inclined spike receiving surface and for directing spikes into the helix, the guide means also serving to prevent engagement of the spikes with the leading edge of the helix; and
   means for receiving each spike from the helix and for positioning the spike to be driven.

55. In a spike orienting and positioning process, the improvement comprising:
   receiving a plurality of randomly oriented spikes each having a head and a shank on an inclined spike receiving surface having at least one slot formed therein characterized by spaced, parallel edges positioned to receive spikes therethrough and to support the received spikes by engagement with the spike heads;
   lifting individual spikes from the plurality and subsequently dropping each lifted spike back toward the surface under the action of gravity so that spikes from the plurality fall into the slot formed in the spike receiving surface;
   said step of lifting and dropping the spikes being carried out by:
   extending fingers from a rotating drum into engagement with the plurality of randomly oriented spikes to lift the spikes; and
   subsequently retracting the fingers into the drum and thereby dropping the lifted spikes.

56. In a spike orienting and positioning system, the improvement comprising:
   a helix for receiving individual spikes each having a head and a shank and for engaging the head of each spike and thereby rotating each spike into a predetermined orientation;
   said helix being vertically oriented;
   means for discharging individual spikes into the helix so that each spike passes through the helix under the action of gravity;
   said helix having a leading edge, and
   means for preventing spikes from engaging the leading edge of the helix.

* * * * *